UNITED STATES PATENT OFFICE.

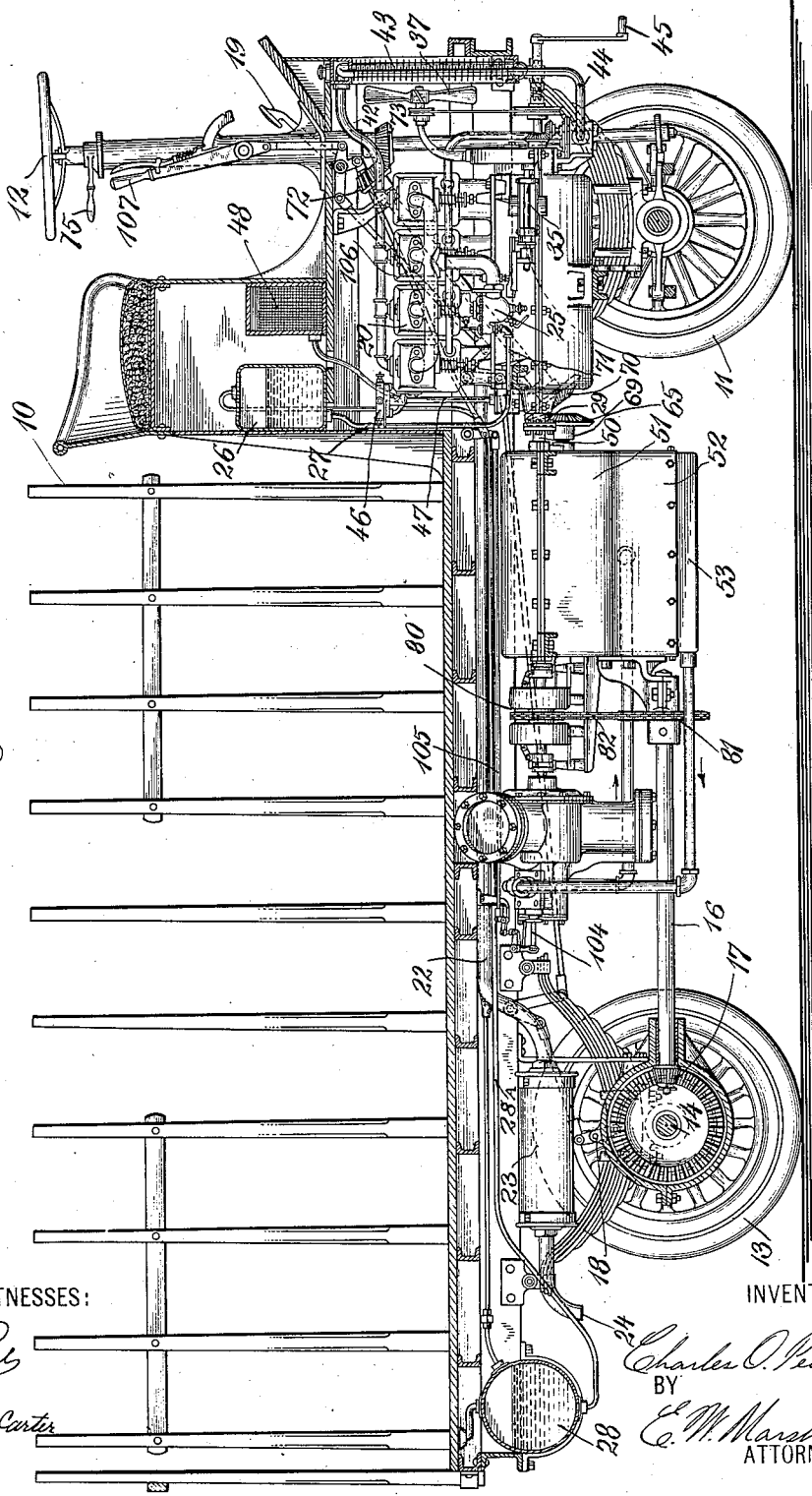

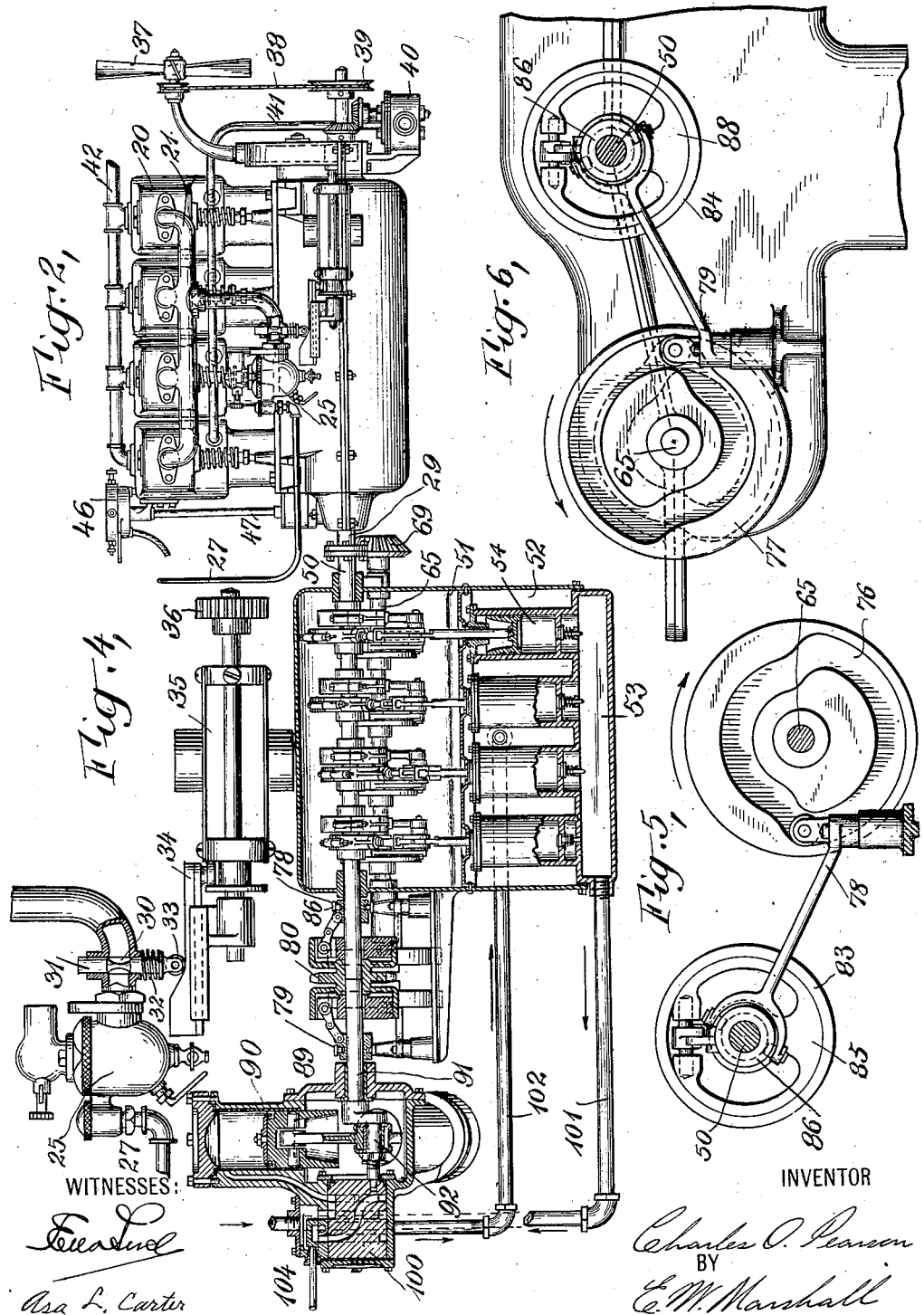

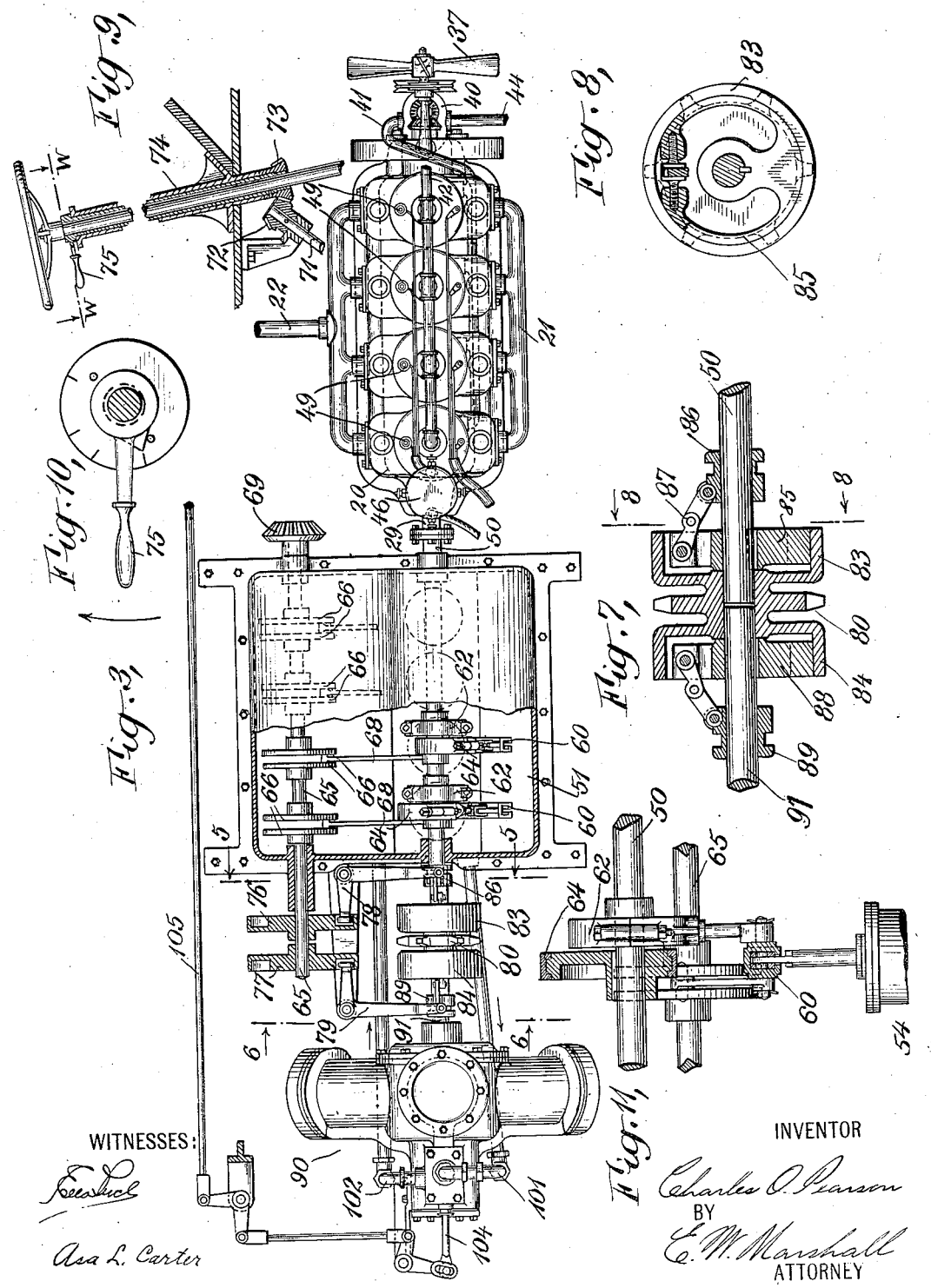

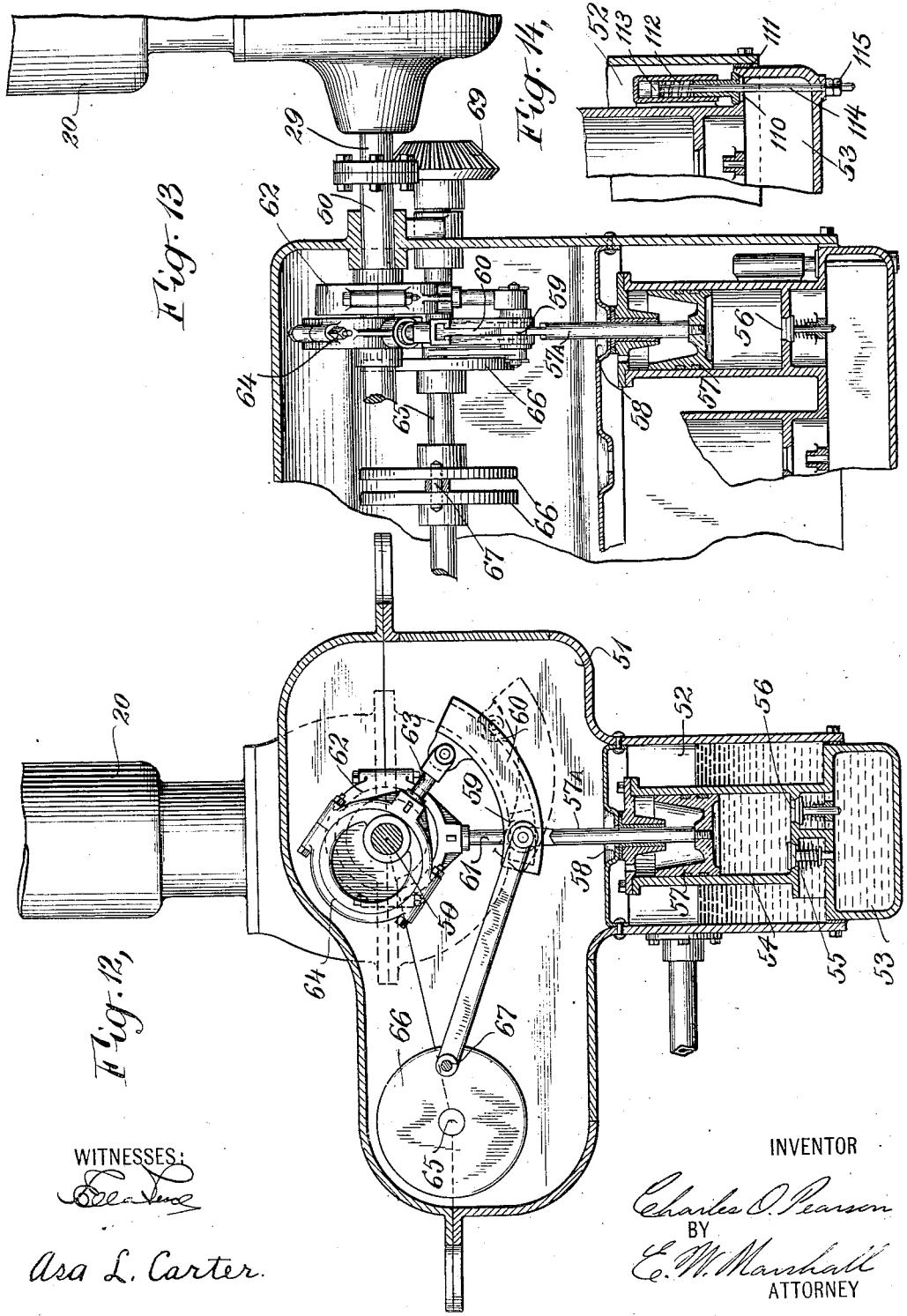

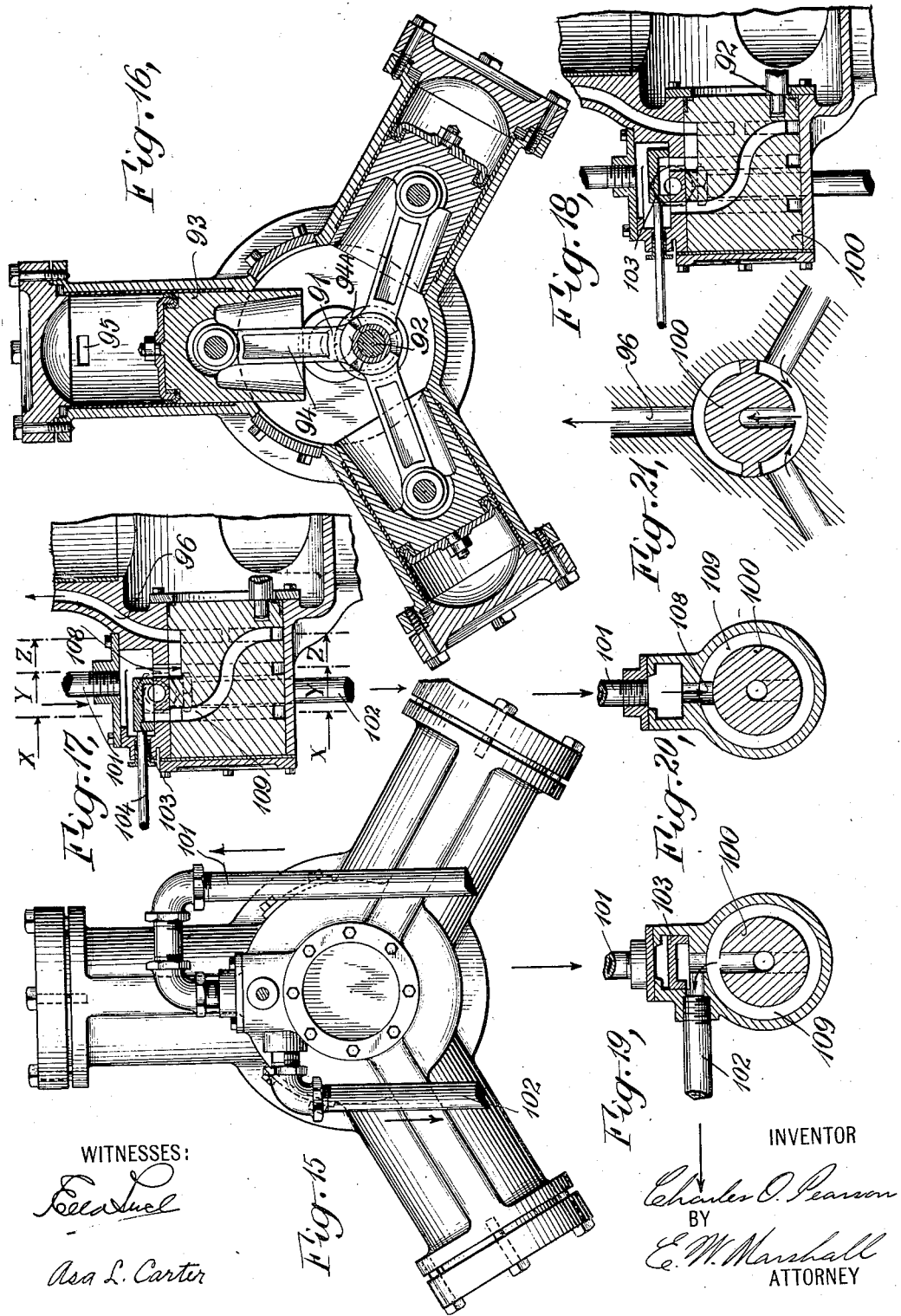

CHARLES O. PEARSON, OF NEW YORK, N. Y.

POWER-TRANSMISSION SYSTEM.

1,055,553.  Specification of Letters Patent.  Patented Mar. 11, 1913.

Application filed September 12, 1908. Serial No. 452,756.

*To all whom it may concern:*

Be it known that I, CHARLES O. PEARSON, a citizen of the United States, and a resident of the borough of Brooklyn, in the county of Kings, in the city and State of New York, United States, have invented certain new and useful Improvements in Power-Transmission Systems, of which the following is a specification.

My invention relates to a power transmission mechanism whereby the power generated by a prime mover may be transmitted to a driven member at any desired speed or in opposite directions in a simple and efficient manner.

By means of my invention the motor or prime mover may have a rotation in one direction at a substantially constant rate of speed, and the driven member may be connected therewith in such a way that it may be driven in either direction and its rate of rotation varied from zero to a desired maximum with a uniform change of rate, not cut up into a series of steps, and manually controlled to a great nicety.

More especially, the object of this invention is to supply the need of a suitable mechanism whereby the power generated by an internal combustion engine may be transmitted to a mechanism driven by the engine, such, for example, as a truck or an automobile, in such a manner that nearly all the power generated by the engine may be utilized in the driven member regardless of the speed at which such member is driven, and to give a positive and easily manipulated control over the speed and direction of movement of the driven member.

These and further objects of my invention will appear in the following specification in which I will describe the construction and operation of certain apparatus which I have chosen as an illustration of the invention, and the novel features of which will be set forth in the appended claims.

Referring to the drawings, Figure 1 is a side elevation of an automobile truck with my invention applied thereto, a part of the truck and some of its associated parts being shown in section. Fig. 2 is a side elevation of a gasolene motor, together with a connected pumping apparatus and an associated liquid or fluid motor mechanism, together with a part of the controlling device, which devices are combined in a novel manner. Some of the parts in this figure are broken away to more clearly show the construction, and some of the parts are shown in section. In Fig. 3 I have shown a plan view of the parts which are illustrated in Fig. 2, with some parts broken away and others shown in section. Fig. 4 is a side elevation of a carbureter with its throttle valve shown in section, together with a centrifugal governor mechanism for controlling the throttle valve. Fig. 5 is a sectional end elevation of a part of the speed control mechanism, the view being taken from the front of the truck shown in Fig. 1 on the line 5—5 of Fig. 3. Fig. 6 is a sectional end elevation taken from the opposite end of the truck on the line 6—6 of Fig. 3, and showing the parts which are shown in Fig. 5, together with the casing of the pumping apparatus upon which these parts are supported. Fig. 7 is a sectional side elevation of a clutch mechanism which I use in connection with the controlling device. Fig. 8 is a sectional end elevation of the clutch, the section being taken on the line 8—8 of Fig. 7. Fig. 9 is a sectional side elevation of the steering wheel and speed control lever. A sectional plan view of this part of the apparatus taken on the line W—W of Fig. 9 is shown in Fig. 10. Fig. 11 is a side elevation, partly in section, of an adjustable eccentric device which is shown more fully in Figs. 12 and 13. This Fig. 12 is an end elevation of the pumping apparatus, in section, together with its driving and adjusting mechanisms. Fig. 13 is a side elevation of the same parts with only one of the pump cylinders shown and that drawn in section. Fig. 14 is a sectional side elevation of a relief valve for the pump. Fig. 15 is an end elevation, and Fig. 16 is a sectional end elevation of a fluid pressure motor which I use in transmitting the power of the prime mover to the driven member. Fig. 17 is a sectional side elevation of the controlling and the reversing valves of this motor with their ports connected in one manner. Fig. 18 is a similar view of the same parts with the reversing valve moved to connect the ports differently. In Figs. 19, 20 and 21 three sectional end views of the valves are shown, the sections being taken, respectively, on the lines X—X, Y—Y, and Z—Z of Fig. 17.

Like characters of reference designate corresponding parts in all of the figures.

10 designates a truck upon which the various parts of the apparatus are mounted. 11 are its forward wheels which may be guided by means of a steering wheel 12 and any desired connecting mechanism. 13 are its rear wheels which are mounted upon a journal 14 which is driven together with the wheels 13 by a transmission shaft 16 and suitable gearing 17.

18 is a brake for the journal and the wheels 13, which is arranged to be applied by a treadle 19 with which it is connected by various parts which are shown in Fig. 1 of the drawings, but which I have not described as it is not a part of this invention.

20 designates a prime mover which, in this case, is shown as a four-cylinder four-cycle gasolene engine. 21 is its inlet or supply pipe, and 22 its exhaust which may be led through a muffler 23 and off through pipe 24.

25 is a carbureter which is supplied from a gasolene tank 26 through a pipe 27.

28 is an auxiliary gasolene supply tank from which gasolene may be forced through pipe 28ᴬ into tank 26 by means of pressure obtained from the exhaust.

29 is the shaft of the engine 20.

30 is a throttle valve for regulating the speed of the engine. This comprises a plunger 31, pressed downward into open position by a compression spring 32. On the lower end of plunger 31 is an antifriction roller 33 which rests upon a slidable cam member 34.

35 is a centrifugal governor which is arranged to be driven by the engine by means of a gear 36 which is in mesh with another gear on the engine shaft. The governor is so arranged that when the engine tends to exceed its normal speed, it will automatically move the slidable cam 34 forward to close or partly close the throttle valve and thereby maintain the engine at a practically constant rate of speed.

37 is a fan driven by a belt 38 running over grooved pulleys 39 on the engine shaft. This will create an air circulation about the engine for the purpose of preventing overheating of its parts. In addition to this the engine may be provided with a water jacket and a circulation pump 40.

41 is a pipe leading from the pump to the water jacket, and 42 is a discharge pipe from the water jacket to the cooling radiator 43 which is connected by a pipe 44 back to the intake of the pump.

45 is a starting crank for the engine.

At 46 a spark timer or circuit breaker is shown. This is driven by the engine shaft 65 through a vertical shaft 47 and is connected with a battery 48 and with the spark plugs 49 of the engine in the usual manner.

50 is the pump actuating shaft which is directly coupled with and is a continuation of the engine shaft 29.

51 is a casing which surrounds the pumping apparatus and supports certain parts thereof. The lower part of this casing forms a reservoir 52 for oil or other suitable fluid, and is closed at the bottom by a part which forms a pressure tank 53.

54 designates one of the pump cylinders. Four of these are shown as this is a preferred number, but I do not wish to limit myself in any way to this or any other number of cylinders. Their driving eccentrics are equally spaced about the shaft 50 so as to cause the pump to have as steady a discharge as practicable. As these pump cylinders and their associated parts are substantially alike in construction I will describe these parts in conjunction with but one of them.

55 is an outlet valve between the reservoir 52 and the bottom of this cylinder.

56 is an outlet valve between the bottom of the cylinder and the pressure tank 53.

57 is a piston, and 57ᴬ is its piston rod which is vertically guided in a bearing 58. The upper end of this rod is connected with or is constructed to form a slidable crosshead block 59. This slidable cross-head block is fitted into a groove within a segmental adjusting member 60 which is supported upon and actuated by the shaft 50 in a peculiar manner. One of its ends is connected by a rod 61 with a collar 62 which is concentrically disposed upon the shaft. Its other end is connected with a collar 64 by a rod 63, which collar is eccentrically mounted upon shaft 50. When the parts are in the positions in which they are shown in Fig. 12 the member 60 will be reciprocated from its position shown in full lines to that indicated by the dotted lines by the eccentric 64, but no movement will be imparted to the piston 57. When the segmental adjusting member is rotated about the shaft 50 this reciprocatory movement is imparted to the piston 57 in an increasing amount until the full stroke of the eccentric 64 is applied to the piston, which will be the case when the rod 63 is directly above the piston rod 57ᴬ. The length of the piston stroke may therefore be varied any desired amount from zero to the eccentricity of the collar 64.

65 is a regulating shaft which is cut up into sections and upon which are a series of disks 66. These disks are joined together by pins 67, each of which is connected by a link 68 with one of the segmental adjusting members 60.

69 is a bevel gear upon one end of shaft 65, by means of which it may be rotated. It may be seen that the positions of all of the members 60, and consequently the length of stroke of the pump pistons may be varied at will by rotating the shaft 65.

70 is a bevel gear meshing with gear 69 and affixed to the end of a shaft 71. 72 is a bevel gear on the other end of shaft 71, and this is in mesh with another bevel gear 73 on the end of a sleeve 74 which surrounds the steering gear shaft. On the upper end of sleeve 74 a hand lever 75 is affixed by means of which the rotation of the shaft 65 and the various adjusting means it controls and actuates may be readily manipulated. These parts are shown in Figs. 1, 9 and 10, and it will later appear that by the simple movement of the hand lever 75 the speed of the driven member may be controlled. On the rear end of shaft 65 a pair of cam members 76 and 77 are affixed.

78 is a bell crank lever one end of which is provided with an antifriction roller which coacts with the cam member 76 to be moved in or out in relation to the operating shaft 65. The other end of this bell crank lever is in engagement with a slidable collar 86 and is arranged to actuate it and the clutch which it controls. 79 is another bell crank lever similarly connecting the cam member 77 and a slidable collar 89. The actuating grooves in these cams are so proportioned and arranged that the cam 77 will cause the driving member 80 to be connected with the shaft of a motor 90 during this part of the rotation of the regulating shaft 65, which causes the pump stroke to be increased, but to disconnect it from this shaft when the speed of the motor shaft has been brought up to that of the engine. The groove in cam 76 is concentric through that portion of it which corresponds with the rotation of shaft 65 above described, but is arranged to cause the driving member to be connected with the pump shaft 50 at the time it is disconnected from the motor shaft 91.

80 designates the driving member which is mounted upon the pump actuating shaft 50 and the motor shaft 91. The central portion of this driving member is constructed in the form of a sprocket-wheel. 81 is a sprocket-wheel upon the transmission shaft 16, and 82 a sprocket-chain running over these two sprocket-wheels and connecting them together. The forward and rear parts of the driving member are constructed to form housings 83 and 84, respectively.

85 is a clutch member connected to the shaft 50 and arranged to be expanded into engagement with the housing 83 by means of a slidable collar 86 upon the shaft 50, and connecting mechanism 87 to lock the pump actuating shaft and the driving member 80 together when the collar 86 is moved toward the clutch member 85. 88 is a similar clutch member keyed to the motor shaft 91 and arranged to be brought into engagement with the housing 84 by the slidable collar 89 to lock the motor shaft and the driving member together.

The motor 90 comprises three cylinders set 120° apart about the axis of its shaft 91. These cylinders and their associated parts are similar so that but one of them need be described. The shaft 91 is constructed to form a crank from which the crank-pin 92 projects. 93 is one of the pistons which is connected with the pin 91 by a connecting rod 94. 94ᴬ is a collar surrounding the ends of this and the other piston rods and preventing them from being pulled away from the pin 92 by back pressure. 95 is a port leading to and from the head of the cylinder to the controlling valve through a passage 96. The crank-pin 92 is extended into a rotary controlling valve member 100 which controls the connections between a pressure supply pipe 101 and an exhaust return pipe 102 to and from all three of these cylinders. When the parts are in the positions shown in Figs. 17 and 21, fluid pressure is being led into the top of the upper cylinder and out from both of the two lower cylinders. When the piston within the upper cylinder reaches the lower end of its stroke, the rotary valve will be moved into such a position as to connect its port 95 with the exhaust, and that of one of the other cylinders with the supply pipe. This valve and its ports are not arranged to allow for expansion as the device as shown is designed to be run with a non-expansible liquid such as oil. The changes necessary to adapt this motor to be driven by compressed air or other expansible fluid can readily be made by anyone skilled in the art. I prefer to use a thin lubricating oil as this will work smoothly as a driving fluid and will keep the parts clean and free from wear.

103 is a slide-valve which is arranged to reverse the connections of the supply and exhaust pipes relative to the various ports to which they are connected by the rotary valve 100. This may be done by means of a valve rod 104 which, through the mechanical connections shown, in which the rods 105 and 106 are included, is arranged to be manually controlled by a lever 107. From Fig. 17 the manner in which this reverse is accomplished may be seen. When the parts are in the positions here shown, the inlet pipe is connected with a port designated by 108 and the passage 96, while the port 109 is connected with the exhaust pipe 102. But if the slide valve 103 is pushed forward as far as it will go, it may be seen that this relation is reversed and that the port 108 and the passage 96 will now be connected with the exhaust pipe 102 while the port 109 is connected with the supply inlet.

The above described arrangement of cylinders and valves is chosen for the purpose of illustrating the manner of carrying out my invention, for by it there will be no dead center and there will always be a thrust upon the crank-pin 92 at all parts of its travel so that a nearly uniform torque upon motor shaft 91 may be obtained even when the latter is being driven at a slow speed.

The engine 20 is started when the controlling or operating shaft 65 is in such a position that the engine shaft 29 will be locked only to the pump actuating shaft 50, and the pump pistons will not move. There will then be no load upon the engine so that it may be more easily rotated. The lever 107 may be placed in proper position to cause the truck to move either forward or backward when it is started. Now, by moving the speed-control lever a small amount the pump pistons will be reciprocated through a short stroke. Each of them will alternately draw in a small amount of the liquid from the reservoir 52 and force it out into the tank 53 under pressure. This tank is always connected with the ports of motor 90 through supply pipe 101 so that the small amount of liquid pumped will be forced into the cylinders of the motor and will cause the latter to drive its shaft 91, and through it, the driving member 80, sprocket-chain 82, transmission shaft 16, and the truck slowly in one direction. The pipe 102 is provided for the purpose of leading the fluid back to the reservoir. No matter how slowly the truck is driven, the torque on the transmission shaft will be practically constant and the full power of the engine will be available for driving the truck. Thus in climbing hills, a load, limited only by the strength of the truck, may be moved. Moreover, in crowded city streets this control is of great advantage as the truck may be stopped by merely returning the speed control lever to its original position, or may be advanced or backed a few inches only if desired without any jumps or strains.

The speed at which the truck is driven may be increased steadily at will by the simple manipulation of the speed-control lever which will increase the length of the pump-stroke and will therefore deliver a greater quantity of the pumped fluid to the motor 90. The maximum speed of the motor 90 may be equal to the speed of the engine 20, so that when the operating or controlling shaft has been moved over to obtain the full piston-stroke within the pumping apparatus, and thereby giving full speed to the motor, the motor shaft 91 will be brought up to sufficient speed to rotate in unison with the engine shaft 29. When these conditions are obtained the cam members 76 and 77 will have been rotated into such positions that they will then disconnect the driving member 80 from the motor shaft 91, and lock it directly to the pump shaft 50 by means of the clutches which I have described, so that the engine will directly drive the truck. The grooves in cams 76 and 77 are so set that the cam 76 will cause the clutch 83 to be applied at the same time the cam 77 causes the release of clutch 84, so that there will be no slipping during this part of the operation.

The cams are so constructed that they actuate the clutches only when the two shafts are running at practically the same rate of speed. Consequently, clutches are not subjected to the wear which the usual speed-changing clutches undergo. Obviously, the operator should not actuate these clutches when the motor shaft is running in the reverse direction to that of the engine shaft, and if desired, the parts may be so arranged that he cannot operate them under such conditions. Further movement of shaft 65 will move the link mechanism back again until the pump pistons come to rest. Consequently the pump will cease to operate, the fluid circulation will stop, and the motor will remain inactive while the driven mechanism is being driven directly by the engine. The rotation of the controlling shaft 65 is divided up to produce four operations. First, the eccentric link mechanism above described will be shifted to increase the stroke of the pump pistons; second, the clutch member 88 will be disengaged from the housing 84; third, the clutch member 85 will be moved into engagement with housing 83, and fourth, the link mechanism will be shifted back to gradually bring the pump pistons to rest. These operations may, of course, be reversed, and may all take place while the parts are in motion.

I have shown in Fig. 14 a port or passage 110 leading from the pressure tank 53 and the reservoir 52. This port is normally closed by a check-valve 111 which is pressed downward upon its seat by a compression spring 112. 113 is a plug against which this spring presses. A stem 114, which is threaded on its lower end, projects down through the casing and is provided with units 115 by means of which the spring and the check-valve may be adjusted. This arrangement acts as a safety valve, for in case the pressure in tank 53 becomes excessive, it will lift the check-valve and allow the fluid to pass up into the reservoir 52.

By means of the arrangement here described the engine may be run at a practically constant speed automatically maintained regardless of the load which is put upon it. Consequently, the gasolene adjustment may be made to give the best efficiency, and this will insure freedom from the smoke and noxious gases emitted from engines of this type which do not burn their gases when their speed is varied in the manner heretofore necessary to drive an automobile under varying conditions. The motor 90 may be used as a brake in descending hills, and the speed of the truck perfectly controlled under these conditions. The full power of the engine running at its most efficient speed is always available for moving the truck at any speed up to the full power capacity of the engine. That means that almost any load may be driven at some speed, and that this speed may be as high as the weight of the load and the power of the engine will permit. When the weight of the load and the speed at which it is moved do not require the full power of the engine, the governor will automatically cut down the fuel supply and thus decrease the running expense. The governor is the element which controls the amount of power developed by the engine, and the manually actuated device controls only the speed and the direction at which the driven member is driven.

The control of this apparatus is not only simple, but it will prolong the life of the engine and the truck, for the driver can not —even if he will—put any undue or sudden strains upon the parts.

The novel combinations which I have invented may be made with other forms of motive power than gasolene engines. The specific form of pumping apparatus which is herein illustrated is not necessary; other types of fluid pressure motors may be substituted for the kind described, and the combination used to drive other kind of loads than automobiles. In other words, the invention is capable of wide variations in construction, and the combination is applicable to a wide field in the mechanical arts.

One of the advantages of this system is that the back pressure upon the motor pistons due to the load it is driving may be balanced by manual adjustments and just enough extra pressure supplied to them to overcome the resistance of the load and to drive the load at desired speed. Moreover this speed may be increased at will up to the limit of power supplied by the engine. When the load is at rest, the engine will run free as all the other parts of the apparatus are cut out of operation.

What I claim is:—

1. A prime mover, a fluid pressure motor indirectly actuated thereby, intermediate fluid pressure means for transmitting the power of the prime mover to the motor at different speeds, a driven member, and means for connecting the driven member to the fluid pressure motor, and for disconnecting it therefrom and connecting it with the prime mover only when the speed of said motor is brought up to that of the prime mover.

2. A prime mover, a pumping apparatus driven thereby, a fluid pressure motor, means for regulating the pumping apparatus to thereby vary the speed of said motor, a driven member, means for connecting the driven member to the motor and for disconnecting it therefrom and connecting it with the prime mover only when the speed of the motor is brought up to that of the prime mover.

3. A prime mover arranged to run at a substantially constant rate of speed, a pumping apparatus driven thereby, a fluid pressure motor driven by the pumping apparatus, means for regulating the pumping apparatus to thereby vary the speed of the motor from zero to that of the prime mover, a driven member, means for connecting the driven member to the motor, and for disconnecting it therefrom and connecting it with the prime mover only when the speed of the motor is brought up to that of the prime mover.

4. A prime mover having a shaft arranged to rotate at a substantially constant rate of speed, a pumping apparatus driven thereby, a fluid pressure motor driven by the pumping apparatus, said motor having a shaft, means for regulating the pumping apparatus to vary the speed of the motor shaft, a driven member, means for connecting the driven member with the motor shaft, and for disconnecting it therefrom and connecting it with the prime mover shaft only when the speed of the motor shaft is brought to that of the prime mover shaft.

5. A prime mover having a shaft arranged to rotate at a substantially constant rate of speed, a pumping apparatus driven thereby, a fluid pressure motor having a shaft, in alinement with the shaft of the prime mover, said motor being driven by the pumping apparatus, means for regulating the pumping apparatus to thereby vary the speed of the motor from zero to that of the prime mover, a driven member loosely mounted upon both of said shafts, means for connecting and disconnecting said driven member with and from either of said shafts, and means for changing said connection when said shafts are running at the same rate of speed.

6. A prime mover having a shaft arranged to rotate at a substantially constant rate of speed, a pumping apparatus driven thereby, a fluid pressure motor having a shaft in alinement with the shaft of the prime mover, said motor being driven by the pumping apparatus, means for regulating the pumping apparatus to thereby vary the speed of the motor from zero to that of the prime mover, a driven member loosely mounted upon both of said shafts, means for connecting and disconnecting said driven member with and from either of said shafts, and a controlling shaft arranged to actuate the pump regulating means and to change the connections between the driven member and said shafts.

7. A prime mover having a shaft arranged to rotate at a substantially constant rate of speed, a pumping apparatus driven thereby, a fluid pressure motor having a shaft in alinement with the shaft of the prime mover, said motor being driven by the pumping apparatus, a controlling device for regulating the pumping apparatus to thereby vary the speed of the motor from zero to that of the prime mover, a driven member loosely mounted upon both of said shafts, a clutch mechanism arranged to connect and disconnect said driven member with and from either of said shafts, said clutch mechanism being actuated by the controlling device to change said connection when said shafts are running at practically the same speed.

8. A prime mover arranged to run at a substantially constant rate of speed, a pumping apparatus driven thereby, a fluid pressure motor driven by the pumping apparatus, at different rates of speed, mechanism driven by said motor, a clutch mechanism arranged to connect said mechanism with the motor while the motor is running slower than the prime mover, and to disconnect said mechanism from the motor and to connect the mechanism with the prime mover when the motor has reached the speed of the prime mover, and a single manually operated shaft for regulating the pumping apparatus to vary the speed of the motor, and for actuating the clutch mechanism.

9. A prime mover arranged to run at a substantially constant rate of speed, a fluid supply, a pumping apparatus arranged to circulate said fluid, a motor driven by the circulation of said fluid at different speeds, a mechanism driven by the motor when said motor is running at slower speeds than that of the prime mover, controlling means for regulating the pumping apparatus to vary the circulation of the fluid to vary the speed of the motor, a clutch mechanism for directly connecting the driven mechanism with the prime mover when the speed of the driven member reaches that of the prime mover, and a single manually operated shaft for actuating the controlling means and the clutch mechanism.

10. A prime mover, a pumping apparatus driven thereby, a fluid pressure motor driven by the pumping apparatus, means for regulating the pumping apparatus to thereby vary the speed of said motor, a driven member, means for connecting the driven member to the motor, and for disconnecting it therefrom and connecting it with the prime mover when the speed of the motor is brought up to that of the prime mover, said pump regulating means being arranged to cause the pumping apparatus to cease driving the motor after the driven member has been connected with the prime mover.

11. A prime mover, arranged to run at a substantially constant rate of speed, a fluid supply, a pumping apparatus driven by the prime mover and arranged to circulate said fluid, a motor driven by the circulation of said fluid at different speeds, a mechanism driven by the motor when said motor is running at slower speeds than that of the prime mover, a controlling device for regulating the pumping apparatus to vary the circulation of the fluid to vary the speed of the motor without changing the speed of the pumping apparatus, a clutch mechanism for directly connecting the driven member with the prime mover when the speed of the driven member reaches that of the prime mover, said controlling device being arranged to stop the circulation of the fluid after the driven mechanism has been connected with the prime mover, and manual means for actuating the controlling device and the clutch mechanism.

12. A prime mover having a shaft arranged to run at a substantially constant rate of speed, a fluid supply, a pumping apparatus driven by the prime mover and arranged to circulate said fluid, a motor driven by the circulation of said fluid at different speeds, said motor having a shaft in alinement with the shaft of the prime mover, a mechanism loosely mounted upon both of said shafts and arranged to be driven by the motor when said motor is running at slower speeds than that of the prime mover, a controlling device for regulating the pumping apparatus to vary the circulation of the fluid to vary the speed of the motor, without changing its power, a clutch mechanism arranged to connect and disconnect the driven mechanism with and from either of said shafts, said clutch mechanism being actuated by the controlling device and arranged to change the connection of the driven member from one to the other of the shafts when said shafts are running at the same speed, said controlling device being arranged to stop the circulation of the fluid after the driven mechanism has been connected with the prime mover, and a hand lever for actuating the controlling device and the clutch mechanism.

13. An internal combustion engine arranged to be run continuously at a substantially constant rate of speed, a fluid supply, a power pump driven thereby and arranged to circulate said fluid at different pressures, a fluid pressure motor arranged to be driven by said fluid and to be started slowly by said pump under high pressure and to be driven at increasing speeds under correspondingly decreasing pressures, a driven mechanism arranged to be connected with the motor when said motor is running at slower speeds than that of the engine, means for directly connecting said driven mechanism with the engine when the speed of the motor has reached that of the engine, and means for rendering the pump inoperative when the motor is not running and when said driven mechanism is connected with the engine.

14. A prime mover having a shaft arranged to rotate at a substantially constant rate of speed, a reciprocatory power pump driven thereby, a fluid pressure motor comprising a shaft and a plurality of radially disposed cylinders arranged to produce a driving torque throughout all parts of each of its revolutions, said motor being driven by the pump, means for regulating the pump to vary the speed of the motor without changing its power, a driven mechanism, a clutch arranged to connect and disconnect said mechanism to and from the motor shaft, a clutch arranged to connect and disconnect said mechanism to and from the engine shaft, and means for actuating said clutches when said shafts are running at substantially the same speed.

15. An automobile, a prime mover, a fluid pressure motor, a power pump driven by the prime mover, means for regulating the power pump to thereby vary the speed of said motor, a clutch mechanism for connecting the automobile with the motor and for disconnecting it therefrom and connecting it with the prime mover only when the speed of the motor is brought up to that of the prime mover.

16. An automobile, a prime mover having a shaft arranged to rotate at a substantially constant rate of speed, a power pump driven thereby, a fluid pressure motor having a shaft in alinement with the shaft of the engine, said motor being driven by the power pump, means for regulating the power pump while in motion to thereby vary the speed of the motor from zero to that of the engine, means for connecting and disconnecting said automobile with and from either of said shafts, and means for changing said connection only when said shafts are running at substantially the same rate of speed.

17. An automobile, a prime mover arranged to run at a substantially constant rate of speed, a fluid supply, a power pump, a motor driven by the circulation of said fluid at different speeds, said automobile being driven by the motor when the motor is running at slower speeds than that of the prime mover, controlling means for regulating the power pump to vary the circulation of the fluid to vary the speed of the motor, a clutch for directly connecting the automobile with the prime mover when the speed of the motor reaches a point corresponding with that of the prime mover, and a single manually operated shaft for actuating the controlling means and the clutch.

18. An automobile, a prime mover, a fluid pressure motor, a power pump driven by the prime mover, means for regulating the power pump to thereby vary the speed of the motor, a clutch mechanism for connecting the automobile with the motor, and for disconnecting it therefrom and connecting it with the prime mover, and a single manually operated shaft for actuating the pump regulating means and the clutch mechanism.

19. An automobile, a driving mechanism therefor, a prime mover having a shaft arranged to run at a substantially constant rate of speed, a pumping apparatus driven thereby, a fluid supply, an eccentric link mechanism connecting said prime mover and the pumping apparatus, said link mechanism being arranged to vary the flow of fluid from the pumping apparatus, a fluid pressure motor arranged to be driven by said fluid at different rates of speed, a pair of clutches arranged to connect the automobile driving mechanism with the motor, or with the prime mover, and a single manually operated shaft for actuating said link mechanism and the clutches.

20. An automobile, a driving mechanism therefor, a prime mover having a shaft arranged to run at a substantially constant rate of speed, a fluid supply, a power pump driven by the prime mover; said pump comprising a plurality of cylinders, a piston within each cylinder, eccentric link mechanism connecting said prime mover shaft with each of said pistons, said eccentric mechanisms being equally spaced about the shaft and arranged to vary the length of the strokes of said pistons while the engine is running, a reversible fluid pressure motor comprising a rotary valve and a plurality of radially disposed cylinders arranged to produce a driving torque throughout all parts of each of its revolutions, said motor being driven by the fluid supply, means for regulating the link mechanisms so that fluid may be delivered to the motor at different rates and at inversely proportional pressures to thereby vary the speed of the motor, a pair of clutches arranged to connect the automobile driving mechanism with the motor or with the prime mover, and a single manually operated shaft for actuating the link mechanisms and the clutches.

21. The combination with a prime mover, of pumping mechanism connected thereto, a fluid motor associated with the pumping mechanism, mechanism connected to the motor to be driven thereby, means for connecting the prime mover either to said motor or directly to said mechanism, and means for varying the arrangement of the pumping mechanism, and thereby securing a variation in the fluid delivered by the pumping mechanism.

22. The combination with a prime mover, of pumping mechanism connected thereto, a fluid motor adapted to be driven by said pumping mechanism, means for controlling the pumping mechanism to vary the volume and pressure of fluid delivered thereby in a plurality of successive steps, mechanism adapted to be driven by the motor, and clutch mechanism operable to disconnect the driven mechanism from the motor and connect it directly to the prime mover.

23. An internal combustion engine, an automobile driven thereby, a steering wheel, a fluid pressure power transmission device arranged to vary the speed of the automobile, a speed control lever associated with the steering wheel by means of which said transmission device may be regulated to vary the speed of the automobile from zero to a maximum corresponding with that of the engine, and means operated by said speed control lever for connecting the engine to drive the automobile independently of fluid pressure.

24. The combination of a prime mover, a fluid pressure motor actuated thereby, intermediate fluid pressure means for transmitting the power of the prime mover to the motor at different speeds, a driven member, and mechanism for connecting the driven member to the fluid pressure motor and for disconnecting it therefrom and connecting it with the prime mover without substantially changing the speed of the driven member, and means for operating said mechanism dependent upon a predetermined speed of the fluid pressure motor relative to the speed of the said intermediate means.

25. The combination with a prime mover, of a pumping apparatus driven thereby, a motor operated by fluid pressure supplied by the pumping apparatus, means for regulating the pumping apparatus to vary the speed of the motor, a driven member, and means for connecting the driven member to the motor and for disconnecting it therefrom and connecting it with the prime mover when the motor has brought the speed of the driven member to substantially the speed maintained by its connection with the prime mover.

26. The combination with the prime mover, arranged to run at a substantially constant speed, pumping apparatus driven thereby, a fluid pressure motor driven by the pumping apparatus at different speeds relative to the speed of the pumping apparatus, mechanism driven by the motor, means for connecting said mechanism with the prime mover when the speed of said mechanism has been brought up to substantially that produced by its connection with the prime mover, and a single device for controlling and effecting the variations in the speed of the motor and effecting the operation of said connecting means.

27. The combination with a prime mover, of a driven element, fluid power transmission mechanism for driving said element from the prime mover, means for regulating said mechanism to vary the speed of the driven element, and mechanism governed by said regulating means for cutting off the fluid power from said element and connecting the latter to be mechanically driven by the prime mover when the speed of said element is substantially that due to its mechanical connection to the prime mover.

28. The combination with an automobile, of a prime mover, a fluid power transmission mechanism forming a driving connection between the prime mover and the driving axle of the automobile, means for regulating said mechanism to vary the relative speed of the driving axle and prime mover, and mechanism dependent for operation upon a predetermined condition of said regulating means for connecting the driving axle to the prime mover for operation independently of fluid power when the relative speed of the axle and prime mover is substantially that due to said last named connection.

29. The combination with a prime mover, of pumping apparatus driven thereby, a fluid pressure motor driven by the pumping apparatus, means for regulating the pumping apparatus to thereby vary the speed of said motor, a driven member, means for connecting the driven member to the motor and for disconnecting it therefrom and connecting it with the prime mover when the speed of the driven member is brought up to substantially that maintained by such connection with the prime mover, said pump regulating means being arranged to cause the pumping apparatus to cease driving the motor after the driven member has been connected with the prime mover.

30. The combination with an automobile, of an internal combustion engine, a power pump driven thereby, a motor actuated by power supplied by the pump, means for regulating the power pump to thereby vary the speed of said motor, a clutch connecting the automobile to the motor and for disconnecting it therefrom and connecting it with the engine when the motor has brought the speed of the automobile up to substantially that due to its connection with the engine, and mechanism for operating said clutch and dependent for operation upon the motor being brought to a speed corresponding to that of the pump.

In testimony whereof I have signed my name to this specification in the presence of two subscribing witnesses.

CHARLES O. PEARSON.

Witnesses:
ELLA TUCH,
ASA L. CARTER.